United States Patent Office 2,848,866
Patented Aug. 26, 1958

2,848,866

ARRANGEMENT FOR TRANSMITTING THE POWER OUTPUT OF COMBUSTION ENGINES TO THE WHEELS OF A VEHICLE OR THE LIKE

Leonhard Geislinger, Saint-Germain-en-Laye, France

Application September 1, 1953, Serial No. 381,074

3 Claims. (Cl. 60—12)

This invention relates in general to means for transmitting the power output of power units such as combustion engines to the propelling wheels of vehicles, and has particular reference to novel arrangements for carrying out this transmission.

It is known that a greater power is required to accelerate a vehicle at low speeds than at high speeds. Now combustion engines have a poor flexibility and their output is interesting and high only if the required power is substantially constant. To avoid this inconvenience a required power transformer such as a change-speed transmission with stepped gears, must be provided between the engine and the driving wheels of the vehicle. Besides, hydraulic torque-converters or electrical transmissions are frequently used with relatively powerful engines.

Similarly, pneumatic transmissions have already been proposed. In known arrangements of this type, the combustion motor drives an air compressor designed to absorb the whole of the engine power output. Then the compressed air is expanded in a turbine and the mechanical power supplied by this turbine is subsequently transmitted, through known means such as gears or the like, to the wheels of the vehicle. It is known that one property of turbines is to develop a torque which is in inverse ratio to the R. P. M. value of the turbine; therefore, turbines are suitable for driving vehicles. The optimum efficiency of a turbine is subordinated to a certain R. P. M. value and the pneumatic transmission does not operate without a certain loss in efficiency. These losses increase in proportion with the departure of the turbine R. P. M. value from the aforesaid optimum R. P. M. value.

It is the essential object of this invention to avoid these inconveniences by providing a novel arrangement for transmitting power in a thermal plant for driving vehicles, of the type comprising at least one combustion engine, an air compressor and an expansion turbine, this arrangement being remarkable notably in that it consists in dividing the total power output derived from the combustion engine or engines into two portions, one portion being transmitted through an air compressor and an expansion turbine to the wheels of the vehicle, while the other portion is transmitted directly either to the wheels of the vehicle or to the transmission shaft thereof.

It is another object of this invention to provide an arrangement which is remarkable notably in that it comprises a differential driven by the combustion engine or engines and operatively connected on the one hand with the air compressor and on the other hand with the wheels of the vehicle.

Therefore, one portion only of the engine power output is transmitted directly to the driving wheels of the vehicle (through a conventional gear and shaft arrangement) and the rest or other half of the power available is absorbed by the air compressor and transmitted through pneumatic means to the turbine, the latter transmitting in turn its power output to the driving wheels of the vehicle.

Particularly advantageous conditions of operation may be obtained by diverting one portion of the compressed air from the compressor for supercharging the combustion engine or engines.

To increase the power output of the turbine, part of the heat contained in the exhaust gases from the turbine and or the combustion engine is transferred to that portion of the compressed air which is not diverted for supercharging the power unit.

To further increase the power output of the turbine, the temperature of the compressed air is incremented by injecting and burning fuel in a combustion chamber.

Still in accordance with the teachings of this invention, the efficiency of the transmission may be increased by mixing the engine exhaust gases with the air not used for supercharging purposes, so that the exhaust gases are also expanded in the turbine.

The division of the power output by means of a differential gearing is characterized by the invariability of the ratio of the torque absorbed by the compressor to the torque supplied by the power unit. The power consumption of the compressor increases at a faster rate than the R. P. M. value of the compressor. Therefore, the vehicle's velocity decreases with the R. P. M. value of the power unit. If the arrangement includes a hydraulic transmission and a differential gearing for dividing the power output, this reduction in the number of R. P. M. is attended by a reduction in the power supplied by the engine. In known arrangements it is not possible, consequently, to transmit the whole of the engine power output throughout the range of speeds of the vehicle. On the contrary, in a vehicle constructed in accordance with this invention, the engine's R. P. M. and the pressure of the compressed air increase when the velocity of the vehicle decreases. Since one portion of the compressed air is used for supercharging the engine, the mean effective pressure of the engine will also rise so that the engine power output will remain approximately constant.

The following are the main advantages derived from the arrangement of this invention:

(1) The combustion engine can yield its maximum power, irrespective of the relative velocity of the vehicle;

(2) A transmission without losses—and even with a gain in efficiency—may be obtained;

(3) The power available at the wheels may equal or even exceed the combustion engine power output;

(4) The arrangement according to this invention adjusts itself automatically to the required vehicle speed. A single control lever or the like will be sufficient to regulate the amount of power transmitted to the wheels;

(5) In an arrangement according to this invention no special apparatus is required for dispersing or absorbing the heat developed by transmission losses; now in all the hitherto known types of hydraulic or electrical power transmission methods subsidiary apparatus such as oil-coolers or forced-draught coolers cannot be dispensed with;

(6) In an arrangement according to this invention it is not necessary to provide a turbo-blower or an engine-driven supercharger for supercharging the engine, as the air compressor will supply the necessary air for this purpose;

(7) The weight and cost price of a plant made in accordance with the teachings of this invention are lower than those of any types of hydraulic or electrical transmissions.

The attached drawings forming part of this invention illustrate diagrammatically by way of example one possible form of embodiment of the invention. In the drawings.

Figure 1:
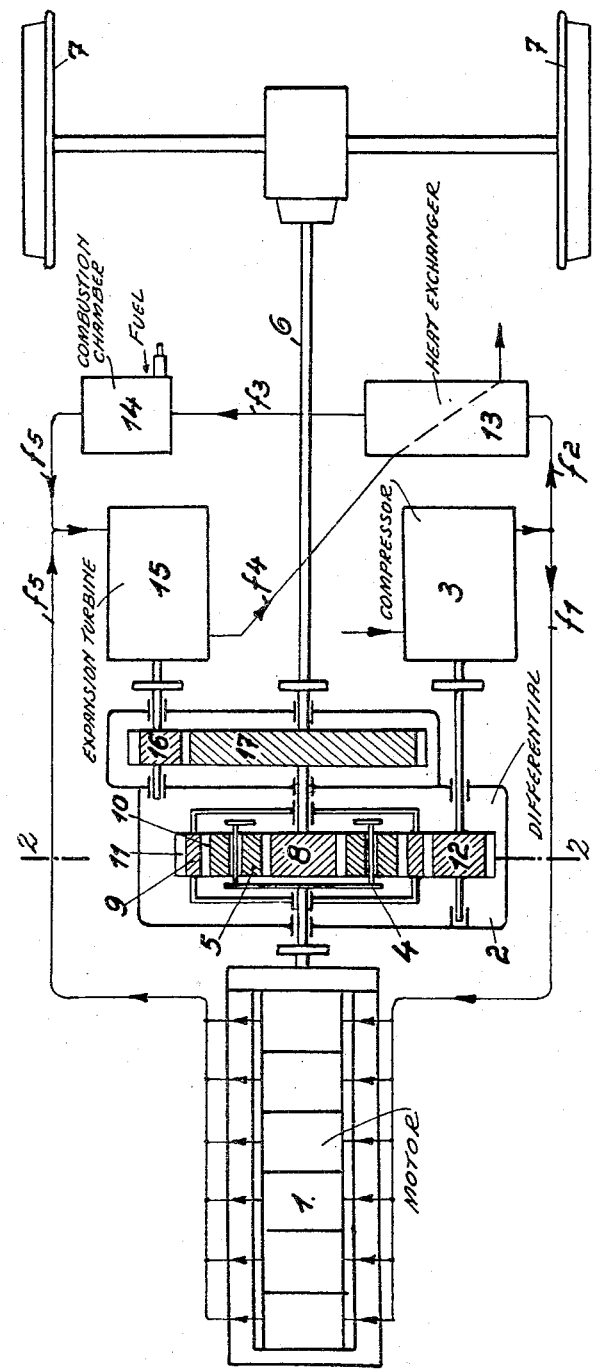
Figure 1 is a diagrammatical layout showing the principle of a propulsive unit for a vehicle, which is constructed according to the method of the invention.
Figure 2:
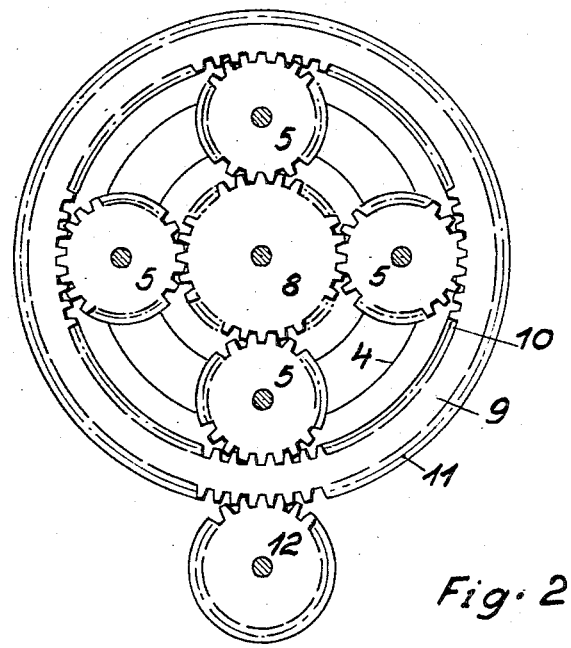
Figure 2 is a sectional view taken upon the line 2—2 of Fig. 1.

In the example shown in Figs. 1 and 2 of the drawings, a combustion engine 1 is drivingly connected with a gearing adapted to divide or distribute the engine speed, for instance a differential gearing 2. One portion of the power output of the engine is absorbed by an air compressor 3 and another portion is transmitted through a transmission shaft 6 to the wheels 7 of the vehicle.

Figure 2 shows the differential gearing in cross-section. The ring-like carrier or cage 4 is driven by the engine 1. The inner or sun gear 8 is keyed on the transmission shaft 6. Therefore, the velocity of the sun gear 8 is proportional to the velocity of the vehicle. The ring gear 9 is provided with inner teeth 10 and outer teeth 11. The outer teeth 11 mesh with a pinion 12 keyed on the shaft of the air compressor 3. One portion of the air induced by the compressor is delivered through a suitable line $f_1$ to the engine and the remaining portion is delivered through a heat exchanger 13 through another line $f_2$. The temperature of this second portion of the air compressed by the compressor 3 is subsequently raised in a combustion chamber 14 in which fuel is injected and burned. Before entering the turbine 15, these gases mix up with the exhaust gases from the engine, as indicated by the arrows representing the lines $f_5$. The power developed by the turbine is transmitted through the pinion 16 and toothed wheel 17 keyed on the transmission shaft 6 to the wheels of the vehicle. The exhaust gases from the turbine are directed through the line $f_4$ to the heat exchanger 13 and part of their heat is transferred to the compressed air circulating through this exchanger. Line $f_3$ shows the connection between heat exchanger 13 and the combustion chamber 14.

Figure 3:
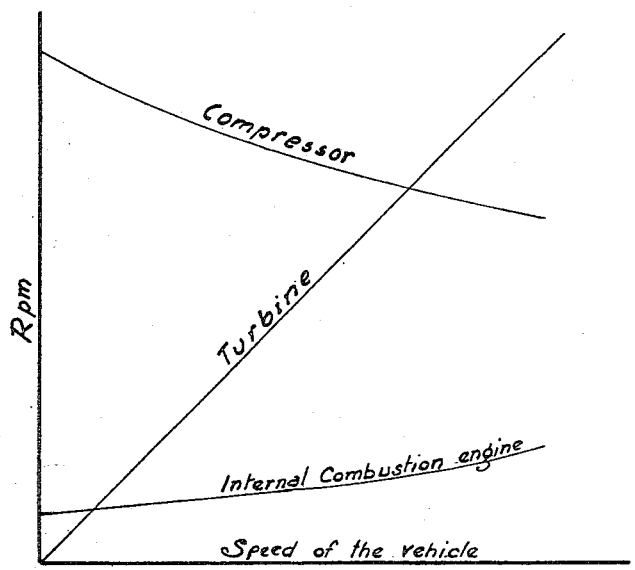
Figures 3 to 5 are diagrams showing the operation of the unit illustrated in Fig. 1.

The diagram of Fig. 3 shows by way of example the number of R. P. M. of the engine, compressor and turbine of the arrangement described hereinabove as plotted against the velocity of the vehicle. It is apparent that the velocity of rotation of the turbine is exactly proportional to the speed of the vehicle. Besides, the corresponding R. P. M. value of the compressor descreases and the engine speed increases as the velocity of the vehicle rises.

Figure 4:
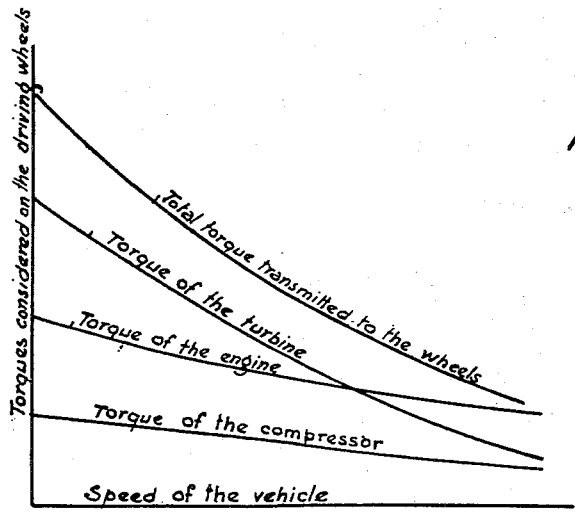

In the diagram of Fig. 4 there are shown by way of example the torques developed directly by the engine and the turbine, as well as those absorbed by the compressor and the vehicle. The delivery pressure of the compressor increases with the R. P. M. thereof. The torque absorbed by the compressor increases at a faster rate than the speed of the vehicle. With the differential gearing 2 between the engine and the compressor the ratio of the torque measured at the engine shaft to the compressor torque is constant; in other words, the engine torque increases also with the decreasing speed. This increase is made possible by the higher pressure of the air supplied to the engine. As already pointed out hereinabove the torque developed by the turbine is incremented when its velocity is reduced. Consequently, a reduced vehicle speed corresponds to a strong increase in the torque transmitted to the driving wheels of the vehicle.

Figure 5:
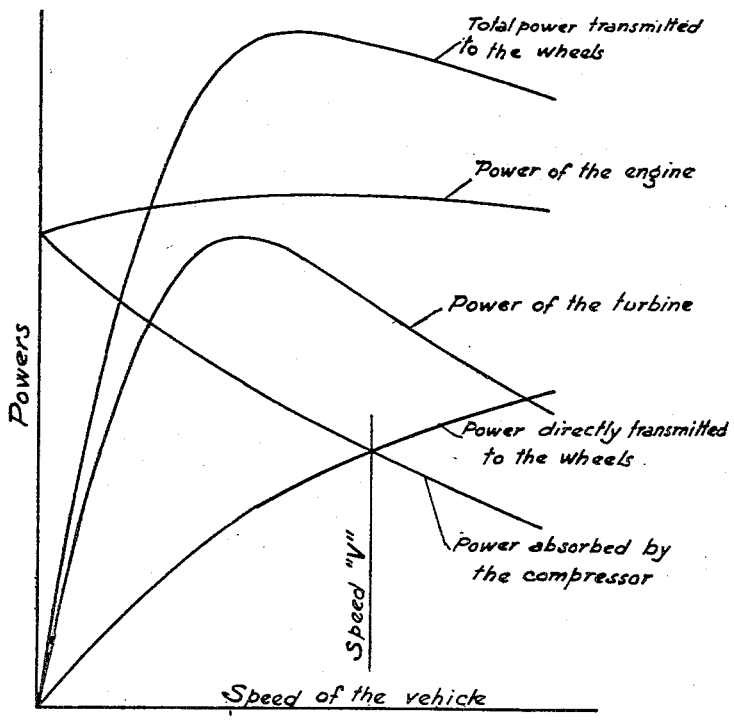

The diagram of Fig. 5 shows also by way of example the power outputs delivered by the engine and the compressor, respectively, and also the powers absorbed by the compressor and the vehicle. When the vehicle is stationary, the total power output of the engine is absorbed by the compressor. In motion, one portion of the power output is transmitted directly to the wheels; this portion increases and the power absorbed by the compressor decreases as the velocity of the vehicle increases. At a certain velocity V of the vehicle the power transmitted directly to the wheels becomes equal to that required for driving the compressor. At velocities higher than V, the major portion of the power is transmitted directly to the wheels. Owing to the increase in the temperature of the gases before they enter the turbine, the power output of this turbine through a substantial range, is higher than the power absorbed by the compressor. The total power transmitted to the driving wheels of the vehicle is the turbine power plus the power transmitted directly to the wheels. In the aforementioned range this power is higher than the power delivered by the engine.

Of course, the invention is not limited to the specific form of embodiment shown and described herein which, like the diagrams of Figs. 3 to 5, are given simply by way of example, for many modifications may be brought thereto without departing from the spirit and scope of the invention as set forth in the appended claims.

What I claim is:

1. In a plant for transmitting the power produced by an internal combustion engine to a driven shaft, the combination of a drive shaft from the engine, planetary gearing including a sun gear, at least one planetary gear, and a ring gear, a connection between said drive shaft and one of said gears, a connection between said driven shaft and another of said gears, a compressor drivingly connected to the third year, a tubular connection between said compressor and the inlet of said engine for supercharging said engine by said compressor, at least one expansion turbine, a tubular connection between said turbine and said compressor to pass the excess greater part of compressed air from the said compressor to said turbine, a tubular connection between the outlet of the engine and the turbine to feed the exhaust gases of the engine to said turbine, a shaft for said turbine, a pinion mounted on said shaft, a gear mounted on said main shaft in mesh with said turbine to transmit the power developed by said turbine to said main shaft, and a combustion chamber arranged to preheat the said excess greater part of compressed air before feeding same to the expansion turbine.

2. In a plant for transmitting the power produced by at least one internal combustion engine to a main shaft, gearing means of the differential type connecting said engine to said main shaft, planet pinions in said gearing means, a sun gear in said gearing means in meshing engagement with said planet pinions and drivingly connected to said main shaft, a carrier in said gearing means carrying said planet pinions, means drivingly connecting said carrier to said engine, a ring gear in said gearing means containing said planet pinions, said ring gear being provided with a set of internal teeth meshing with said planet pinions and a set of external teeth, an air compressor having a driving shaft, a gear meshing with said external teeth of said ring gear keyed on said driving shaft to drive said compressor, a tubular connection between said compressor and the inlet of said engine to supercharge said engine, at least one expansion turbine, a tubular connection between said turbine and said compressor to pass the excess greater part of compressed air from the said compressor to the turbine, a tubular connection between the outlet of the engine and the turbine to feed said turbine by means of the exhaust gases of the engine, and a driving connection between the said turbine and said main shaft.

3. In a plant for transmitting the power produced by at least one internal combustion engine to a main shaft, gearing means of the differential type connecting said engine to said main shaft, planet pinions in said gearing means, a sun gear in said gearing means in meshing engagement with said planet pinions and drivingly connected to said main shaft, a carrier in said gearing means for carrying said planet pinions, means drivingly connecting said carrier to said engine, a ring gear in said gearing means for containing said planet pinions, said ring gear being provided with a set of internal teeth meshing with said planet pinions and a set of external teeth, an air compressor having a driving shaft, a gear meshing with said external teeth of said ring gear keyed on said driving shaft to drive said compressor, a tubular connection between said compressor and the inlet of said engine to supercharge said engine, at least one expansion turbine, a tubular connection between said turbine and said compressor to pass the excess greater part of compressed air from the said compressor to the turbine, a tubular connection between the outlet of the engine and the turbine to feed said turbine by means of the exhaust gases of the engine, a shaft for said turbine, and a pinion mounted on said shaft and a gear mounted on said main shaft meshing with said pinion to transmit the power developed by said turbine to said main shaft.

References Cited in the file of this patent

UNITED STATES PATENTS

| | | |
|---|---|---|
| 1,732,405 | Invernizzi | Oct. 22, 1929 |
| 2,173,855 | Orshansky | Sept. 26, 1939 |
| 2,585,968 | Schneider | Feb. 19, 1952 |

FOREIGN PATENTS

| | | |
|---|---|---|
| 938,066 | France | Mar. 30, 1948 |
| 530,762 | Great Britain | Dec. 19, 1940 |
| 428,240 | Italy | Dec. 10, 1947 |